Feb. 15, 1927.
H. W. WOODGATE ET AL
1,617,889
ELECTRICAL WATER HEATER
Filed April 8, 1926      2 Sheets-Sheet 1
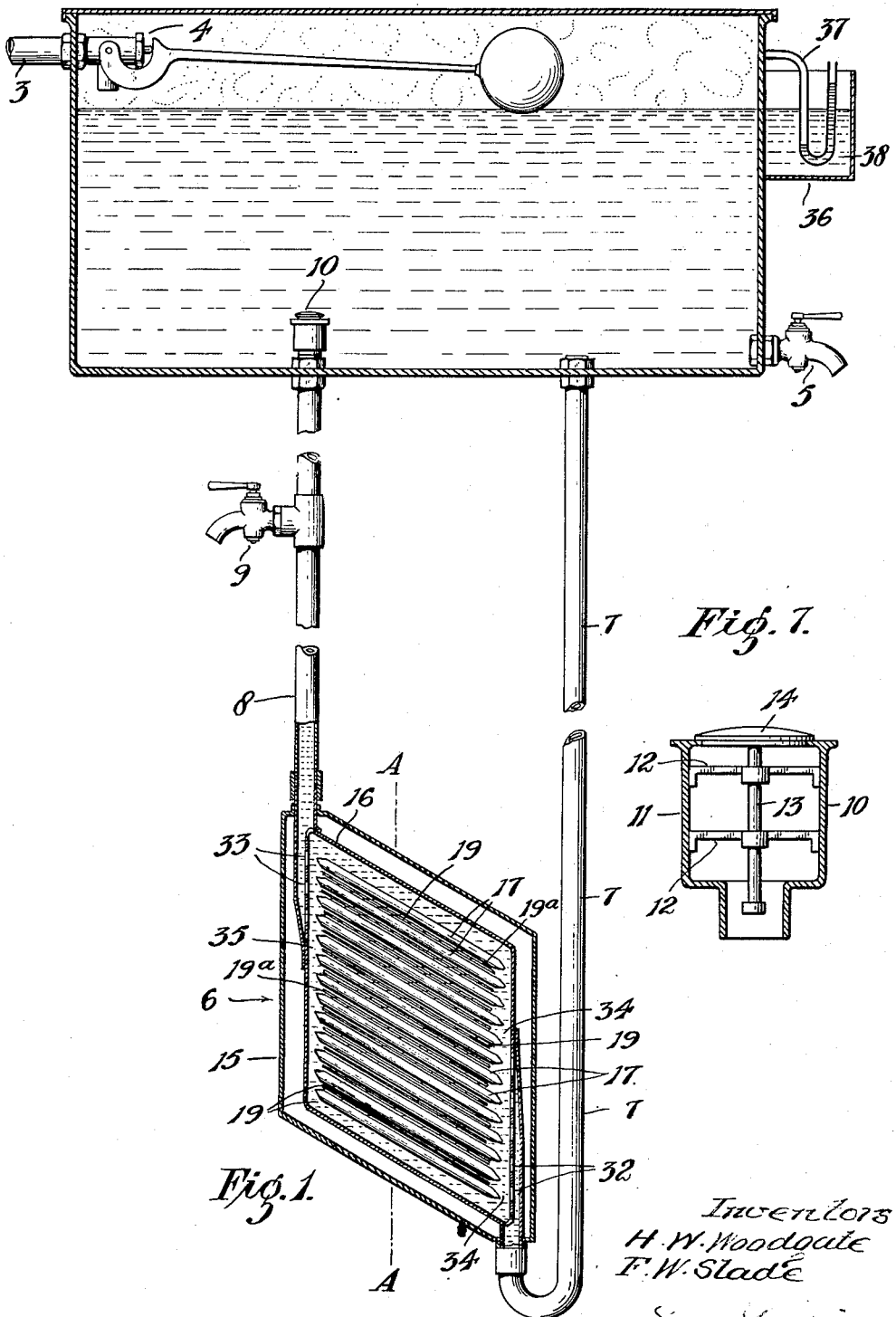
Inventors
H. W. Woodgate
F. W. Slade

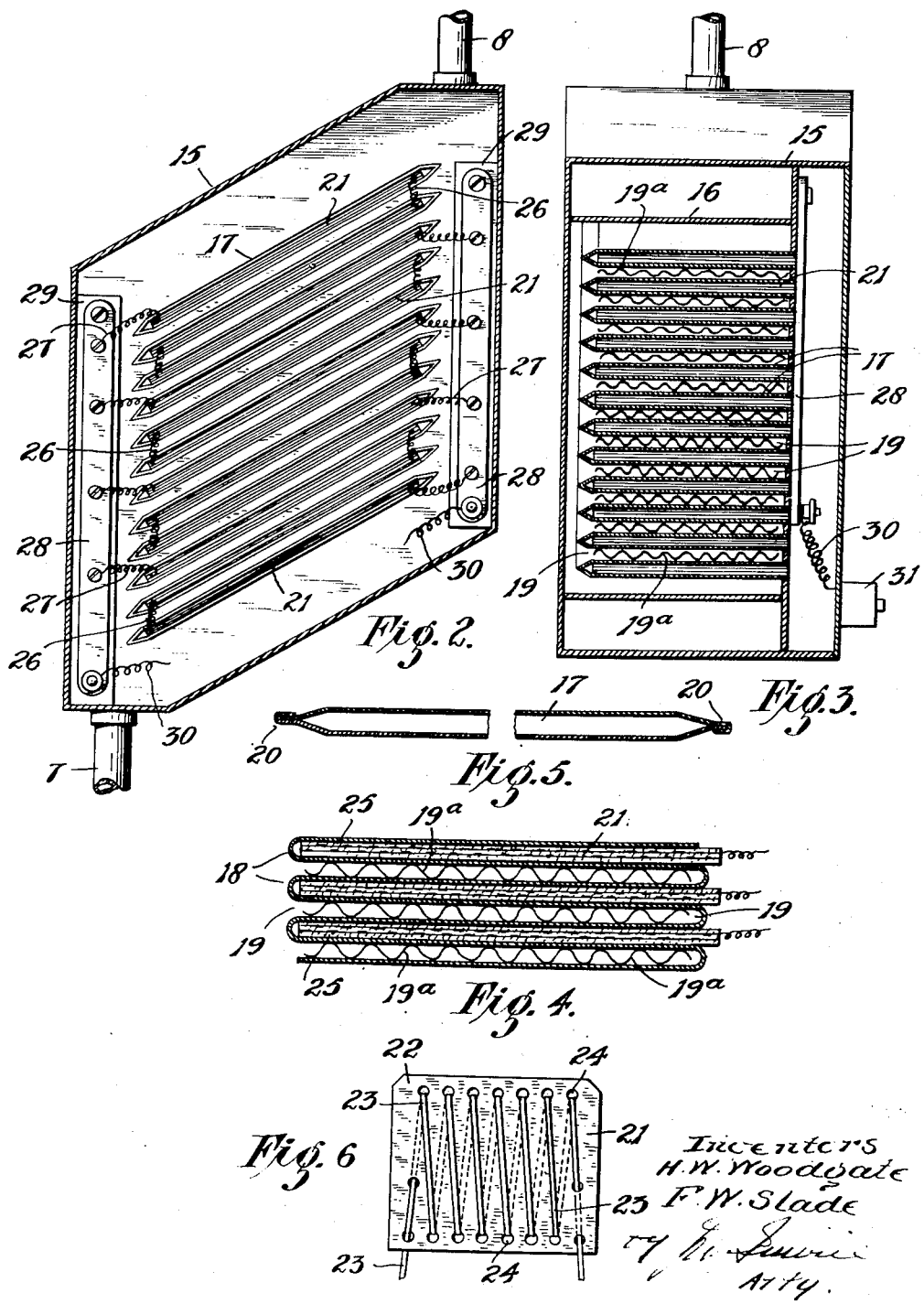

Patented Feb. 15, 1927.

1,617,889

UNITED STATES PATENT OFFICE.

HENRY WILLIAM WOODGATE AND FRANCIS WILLIAM SLADE, OF MELBOURNE, VICTORIA, AUSTRALIA.

ELECTRICAL WATER HEATER.

Application filed April 8, 1926, Serial No. 100,600, and in Australia April 16, 1925.

This invention relates to improvements in electrical water heaters and particularly to water heaters of the circulatory type wherein the cold water is drawn from a cistern and is heated by being circulated through a heater, the heated water being returned to the cistern to heat the body of water therein.

One object of the invention is to provide a water heater wherein each of the heating elements can independently draw a required amount of water according to temperature to which the element is heated.

Another object is to provide a water heater having heating elements, which are individually removable for repair or replacement and are completely surrounded by water so that maximum heating efficiency is obtained.

A further object is to provide a water heater which can be used either as an instantaneous heater or as a circulatory heater as may be required, thus enabling the heated water to be drawn off directly from the heater or alternatively to be returned to the cistern to heat the whole body of water therein.

A still further object of the invention is to provide a water heater having simple and efficient means for positively preventing back-flow of cold water from the cistern.

Reference is now made to the accompanying drawings wherein:

Figure 1 is a sectional view of the improved electrical water heater.

Figure 2 is a rear view of the heater.

Figure 3 is a vertical sectional view of the water heater taken on the line A—A of Figure 1.

Figure 4 is a sectional detail view illustrating the construction of the envelopes containing the heating elements, and the narrow water channels.

Figure 5 is a sectional view of one of the envelopes.

Figure 6 is a detail view of one of the electrical heating elements.

Figure 7 is a sectional view of a one-way valve arranged in the hot water delivery pipe.

In these views, 2 indicates the cistern of a circulatory water heater having a detachable cover, 3 the inlet pipe conveying water to said cistern, 4 a ball-float valve controlling the level of water in the cistern, and 5 the ordinary tap for drawing off hot water from the cistern. Positioned beneath the cistern 2 is an electric heater 6 to which water is supplied through a connecting pipe 7. The water after being heated by circulation through the said heater flows upwardly into a second pipe 8 and is returned to the cistern to heat the body of water therein.

According to the improvements, a draw-off tap 9 is provided on the hot water pipe 8 at a point above the heater 6. When this tap is closed the heater functions in its ordinary capacity as a circulatory water heater, wherein the cold water flows through the pipe 7 to the heater and the water thus heated is returned upwardly through the pipe 8 into the cistern 2 to heat the body of water therein. When, however, the tap 9 is opened, the system is changed to an instantaneous heater, and the hot water is drawn off directly from the heater instead of being returned to the cistern. Thus, quantities of boiling or very hot water can be obtained instantly at any time by merely opening the tap 9, while on the other hand by opening the tap 5 and leaving the tap 9 closed large quantities of hot or warm water can be obtained from the cistern 2.

To prevent back-flow of water from the cistern through the pipe 8 when the tap 9 is opened, a one-way valve 10—see Figure 7—is provided at the upper end of said pipe. This valve comprises a casing 11 having internal guides 12 in which the stem 13 of a mushroom valve 14 is slidably mounted. When the tap 9 is closed and the system is being used as a circulatory water heater, the pressure of the heated water flowing upwardly through the pipe 8 lifts the valve 14 and permits the hot water to flow into the cistern. Immediately the tap 9 is opened to withdraw the hot water directly from the heater 6, the upward flow of hot water to the valve casing ceases and said valve 14 automatically closes gravitationally and prevents the cold water in the cistern flowing downwardly into the pipe 8 and delivery through the tap 9.

The heater 6 is illustrated particularly in Figures 2 to 6, and it comprises an outer casing 15 and an inner casing 16 both of which are preferably formed of sheet metal. The inner casing 16 is of rhomboidal shape and it is suitably spaced from the outer casing 15. Arranged within the inner casing 16 is a plurality of envelopes 17, which are preferably formed from a single sheet 18 of metal as is shown in Figure 4. This sheet of metal is looped or shaped to form the envelopes 17 and also narrow water passages 19 between the said envelopes. The side edges of the envelopes are closed as is shown in Figure 5 by having their edges seam-jointed at 20.

The envelopes 17 are preferably arranged parallel and they are spaced at a required distance apart to provide the narrow water passages 19. These envelopes are also inclined upwardly as is shown in Figures 1 and 2 to assist free flow of water through the narrow water passages and to ensure equal distribution of water.

In each of the water passages 19 there are fitted corrugated separator plates 19ª, which divide the water into streams and provide added heating surfaces to ensure maximum efficiency. These separator plates further serve to prevent buckling of the envelopes 17 under the heat and closure of the water passage 19 when the said envelopes are tightly clamped together.

Fitted into the envelopes 17 are electrical heating elements 21 which are individually removable for repair or replacement, and each of these elements consists of a support 22 formed of mica or like electrical insulating material and having a resistance ribbon wire 23 wound through holes 24 or slots formed therein. Insulating sheets 25 preferably of mica are arranged on opposite sides of the support 22 and they serve to insulate the resistance ribbon wire 23 from the sides of the envelopes.

The heating elements are preferably wired together in series into groups and the groups then connected together in parallel. As shown in Figure 2, the elements are wired together in groups of four by connecting wires 26 and the groups are then wired together in parallel by wires 27 to conductor strips 28 secured to the rear surface of the inner casing 16, but insulated therefrom by sheets 29 of mica or like material. The conductor strips 28 are connected by wires 30 to a suitable plug connector 31 provided on the outer casing 15.

The cold water supply pipe 7 is connected to the lower corner of the inner casing 16 and extends up the side of said casing. A series of water inlet holes 32 is formed in the inner casing 16 in register with the mouth of the water supply pipe 7 and said holes are adapted to distribute water equally between the narrow water passages 19 formed between the envelopes 17 containing the elements. The hot water delivery pipe 8 is connected to the upper corner of the inner casing 16 and extends down the side of said casing, receiving the heated water through outlet holes 33 formed in said casing.

The water supplied to the heater through the inlet pipe 7 flows through the inlet holes 32 into the passageway 34 of the inner casing 16, and is divided into a number of relatively fine streams which flow along the narrow water passages 19. In these passages the water is rapidly heated by conduction from the heating elements 21 in the envelopes 17 and the heated water then flows into the passageway 35 at the opposite end of the inner casing 16. The heated water then passes through the outlet holes 33 into the delivery pipe 8 and is conducted to the cistern 2 or is withdrawn through the tap 9 as previously explained.

As the narrow water passages 19 between the envelopes 17 are substantially straight and inclined upwardly, the water while being heated by the elements 21 has a free direct flow so that any bubbles of steam which may be formed are immediately swept away by the flowing water, thus preventing steam jarring action such as frequently occurs in electrical water heaters of existing types. Furthermore, as each of the narrow water passages 19 is open to the water passageway 34, the water passages can each draw any required amount of water according to the temperature to which their respective heating elements are heated and overheating of any of the heating elements of the heater is thus precluded.

As the envelopes 17 are completely surrounded by the water passages 19, maximum heat absorption by the water is effected and rapid heating of the water with increased efficiency of the heater is ensured.

The heating elements 21 by being entirely enclosed in the envelopes 17 are protected against damage and also from oxidation by exposure to the atmosphere whereby required durability of the said elements is obtained.

The improved heater is equipped with a vapor seal 36 which prevents escape of steam or vapor from the cistern 2 until such time as the water therein has been heated to boiling point. This vapor seal is illustrated in Figure 1, and comprises an U-tube 37 connected at one end to the cistern 2 and having its other end open to atmosphere. The lower end of said U-tube 37 dips into water or other cooling liquid contained in a small tank 38 secured to the side of the cistern 2.

When steam or vapor commences to form in the cistern 2, portion of it passes through the U-tube 37 and is condensed therein by the cooling action of the liquid in the tank 38, thus forming a seal of water in the lower end of said U-tube. This seal of water now effectively prevents the escape of steam from the cistern until the body of water therein has been heated to boiling point when increased vapor pressure within the cistern automatically ejects the sealing liquid in the U-tube through its open end and permits escape of steam from said cistern. By the use of the automatic vapor seal with a closed cistern as herein described, it is found that the water can be quickly raised to boiling point without undue loss of heat by escape of vapor to the atmosphere.

What we do claim is:—

1. An electrical water heater comprising, a casing, a series of inclined spaced envelopes arranged in said casing, electrical heating elements fitted in said envelopes, water passages between said envelopes, a water supply pipe connected to said casing and delivering water to the lower ends of said water passages, and a pipe connected to said casing and receiving the heated water from the upper ends of said water passages, substantially as described.

2. An electrical water heater according to claim 1, and wherein the envelopes are upwardly inclined and all formed from a single looped and shaped piece of sheet metal.

3. An electrical water heater according to claim 1, and wherein the water supply pipe and the water discharge pipe extend along opposite sides of the casing, and holes are formed in the sides of said casing to register with the mouths of said pipes.

4. An electrical water heater according to claim 1, and wherein corrugated separator sheets are fitted in the water passages between the envelopes containing the heating elements to prevent buckling of said envelopes and increase the heating efficiency.

5. An improved electrical water heater comprising, a rhomboidal casing, a series of upwardly inclined and spaced envelopes arranged in said casing and each having one of its ends open to the outside of said casing, narrow water passages provided between said envelopes, electrical heating elements detachably fitted one in each of said envelopes, a supply pipe delivering water to the lower ends of said envelopes, and a discharge pipe receiving heated water from the upper ends of said envelopes, substantially as herein described.

In testimony whereof we affix our signatures.

HENRY WILLIAM WOODGATE.
FRANCIS WILLIAM SLADE.